United States Patent [19]

Nakamura et al.

[11] Patent Number: 5,294,481
[45] Date of Patent: Mar. 15, 1994

[54] PRINTING BLANKET AND METHOD OF MANUFACTURING THE SAME

[75] Inventors: Takato Nakamura; Takao Kawata; Tsukasa Fukuma; Yasunobu Kobayashi, all of Saitama, Japan

[73] Assignee: Fujikura Rubber Ltd., Tokyo, Japan

[21] Appl. No.: 815,321

[22] Filed: Dec. 27, 1991

[51] Int. Cl.$^5$ .................. B32B 27/08; B32B 33/00; B05D 5/00
[52] U.S. Cl. .................. 428/245; 101/DIG. 48; 427/513; 427/517; 427/336; 427/340; 427/342; 427/385.5; 428/246; 428/422; 428/909
[58] Field of Search .................. 428/909, 422, 245, 246; 427/513, 517, 336, 340, 342, 385.5

[56] References Cited

FOREIGN PATENT DOCUMENTS 1390833  4/1975  United Kingdom .

Primary Examiner—James C. Cannon
Attorney, Agent, or Firm—Koda and Androlia

[57] ABSTRACT

A printing blanket including a base fabric and a surface layer in a laminated structure wherein a surface reforming agent containing a perfluoroalkyl group is applied to the surface layer such that a critical surface tension ranging from 10 to 16 dyn/cm appears on the surface of the surface layer is disclosed. To practically manufacture a printing blanket of the foregoing type, there is also disclosed a method wherein a compressible layer is placed on a base fabric, a surface layer is then placed on the compressible layer thereby to form a laminated structure with the base fabric and the compressible layer, and thereafter, a surface modifier containing a perfluoroalkyl group is applied to the surface layer such that a critical surface tension ranging from 10 to 16 dyne/cm appears on the surface of the surface layer. It is preferable that the surface layer is molded of a compound based on a nitrile butadiene rubber. Usually, the surface modifier contains a perfluoroalkyl group of which carbon number remains within the range of 3 to 12.

33 Claims, 1 Drawing Sheet

PRINTING BLANKET AND METHOD OF MANUFACTURING THE SAME

BACKGROUND OF THE INVENTION

1. Field of the Invention

The present invention relates generally to a printing blanket and a method of manufacturing the same. More particularly, the present invention relates to a printing blanket having excellent properties in respect of transference of a printing ink onto a printing medium such as a paper or the like as well as releasability of the printing medium from the printing blanket. Further, the present invention relates to a method of producing a printing blanket of the foregoing type.

2. Description of the Related Art

To facilitate understanding of the present invention, a conventional offset printing press will briefly be described below with reference to FIG. 1 and FIG. 2.

As shown in FIG. 1, the offset printing press is basically constructed by a printing plate drum 1 having a printing plate serving as an original wound thereabout, a printing blanket drum 2 adapted to be rotated in operative association with the printing drum 1, and a pressure drum for squeezing a printing paper 3 against the printing blanket drum 2 from below. A printing blanket 5 is wound around the printing blanket drum 2.

In operation, the printing plate wound around the printing plate drum 1 is coated with an ink so that an image formed by the coated ink is once transferred onto the printing blanket 5 wound around the printing blanket drum 2 and the transferred ink image is then printed on the printing paper 3.

As shown in FIG. 2, the printing blanket 5 used for the printing press as mentioned above is generally constructed such that a compressible layer 52 molded of an elastic material is placed on a base fabric 51 and a surface layer 53 is additionally placed on the compressible layer 52 so that the printing paper 3 comes in contact with the surface layer 53 during a printing operation.

A problem appearing when the printing blanket 5 is used for performing printing operations is such that the surface layer 53 is chemically corroded by an oil based printing ink. For this reason, a low-graded nitrile butadiene rubber having excellent printing properties in respect of transferance of an ink onto a printing medium such as a paper or the like but having inferiority in respect of resistibility against an oil has not been employed for the surface layer 53 but an intermediate/high-graded nitrile butadiene rubber has been hitherto employed for the same. In practice, the intermediate/high-graded nitrile butadiene rubber has an excellent oil resistance. However, it has drawbacks associated with a high critical surface tension of 30 dyn/cm, poor ink transferability and poor paper releasability.

To improve the oil resistibility of the printing blanket, a proposal has been made as to a printing blanket which is coated with, e.g., tetrafluorethylene-propylene copolymer to be later cured, as disclosed in Japanese Examined Publication Patent (Kokoku) NO. 55-38682.

According to this prior invention, basically, the surface layer of the printing blanket is coated with a film having an excellent oil resistibility. However, since this oil resistant film has a very small thickness, there unavoidably appears a phenomenon that the film is readily peeled off from a base fabric. Another problem is that factors of ink transferability and paper releasability should additionally be taken into account for the purpose of manufacturing a printing blanket.

In addition, to improve the ink transferability while an adhering power of the ink to the surface layer is reduced, another proposal has been made as to a printing blanket including a surface layer having a coated film of which critical surface tension is controllably determined within the range of 18 to 25 dyn/cm, as disclosed in Japanese Examined Publication Patent (Kokoku) NO. 56-36077.

Recently, it has been known in the art that receivability of an ink on a printing blanket and transferability of the same on a printing medium such as a paper or the like do not depend merely on the critical surface tension of a thin film on the surface layer of the printing blanket.

Specifically, according to the latter prior invention, silicone, trifluorethylene, polyfluorovinylidene, polypropylene or the like are employed as a material for a layer to be coated. However, it has been known in the art that each of the aforementioned synthetic resins exhibits poor ink receivability even when a critical surface tension less than 18 dyn/cm appears on the coated thin film on the surface layer of the printing blanket.

On the other hand, it has been known in the art that e.g., a fluororubber exhibits excellent ink receivability and transferability even when a critical surface tension less than 18 dyn/cm appears on the film on the surface layer of the printing blanket. In other words, employment of the fluororubber makes it possible to manufacture a printing blanket having a low critical surface tension (i.e., exhibiting excellent ink transferability and paper releasability) as well as excellent ink receivability. In the aforementioned circumstances, there have been hitherto raised from users many requests for providing the printing blanket as mentioned above.

SUMMARY OF THE INVENTION

The present invention has been made with the foregoing background in mind.

An object of the present invention is to provide a printing blanket having excellent oil resistibility and ink receivability while exhibiting improved properties in respect of ink transferability and paper releasability.

Another object of the present invention is to provide a method of very easily manufacturing a printing blanket of the foregoing type at a reduced cost.

According to one aspect of the present invention, there is provided a printing blanket including a surface layer on a base fabric with a compressible layer placed on the base fabric as desired, wherein a surface modifier containing a perfluoroalkyl group is applied to the surface layer such that a critical surface tension ranging from 10 to 16 dyn/cm appears on the surface of the surface layer.

In addition, according to other aspect of the present invention, there is provided a method of manufacturing a printing blanket of the foregoing type, wherein a compressible layer is placed on a base fabric as desired, a surface layer is placed on the compressible layer, and thereafter, a surface reforming agent containing a perfluoroalkyl group is applied to the surface layer such that a critical surface tension ranging from 10 to 16 dyn/cm appears on the surface of the surface layer.

Since the printing blanket of the present invention is constructed such that the surface reforming agent containing a perfluoroalkyl group having excellent water repulsibility and oil repulsibility is employed as a surface reforming agent and applied to the surface layer, the present invention provides advantages that a low intensity of critical surface tension appears on the surface of the surface layer, the printing blanket exhibits excellent ink receivability and oil resistibility, and moreover, ink transferability and paper releasability of the printing blanket can be improved remarkably.

In addition, since the surface reforming agent penetrates into the surface layer of the printing blanket and subsequently remains in the surface layer of the same thereby to reliably prevent coloring grains in a printing ink from invading in the interior of the printing blanket, another advantage of the present invention is that there is no possibility that the remaining material/image remaining on the preceding printing plate after completion of the preceding printing plate is undesirably transferred onto a printing medium such as a paper or the like during a next printing operation.

Additionally, there is no possibility that there appears during a multi-color printing operation a so-called reverse trapping phenomenon, i.e., a phenomenon that a next color to be printed is reversely transferred onto the surface of the printing blanket, resulting in a quality of printing operation being degraded due to contamination with the ink used for the preceding printing operation.

When the method of the present invention is employed for manufacturing a printing blanket, the surface reforming agent having excellent properties as mentioned above can be mixed with an unvulcanized rubber in the form of a solution or as it is to serve as a raw material for the surface layer of the printing blanket. Thus, the printing blanket can very easily be manufactured with the method of the present invention.

Other objects, features and advantages of the present invention will become apparent from reading of the following description which has been made in conjunction with the accompanying drawings.

DESCRIPTION OF THE PREFERRED EMBODIMENTS

Figure 1:
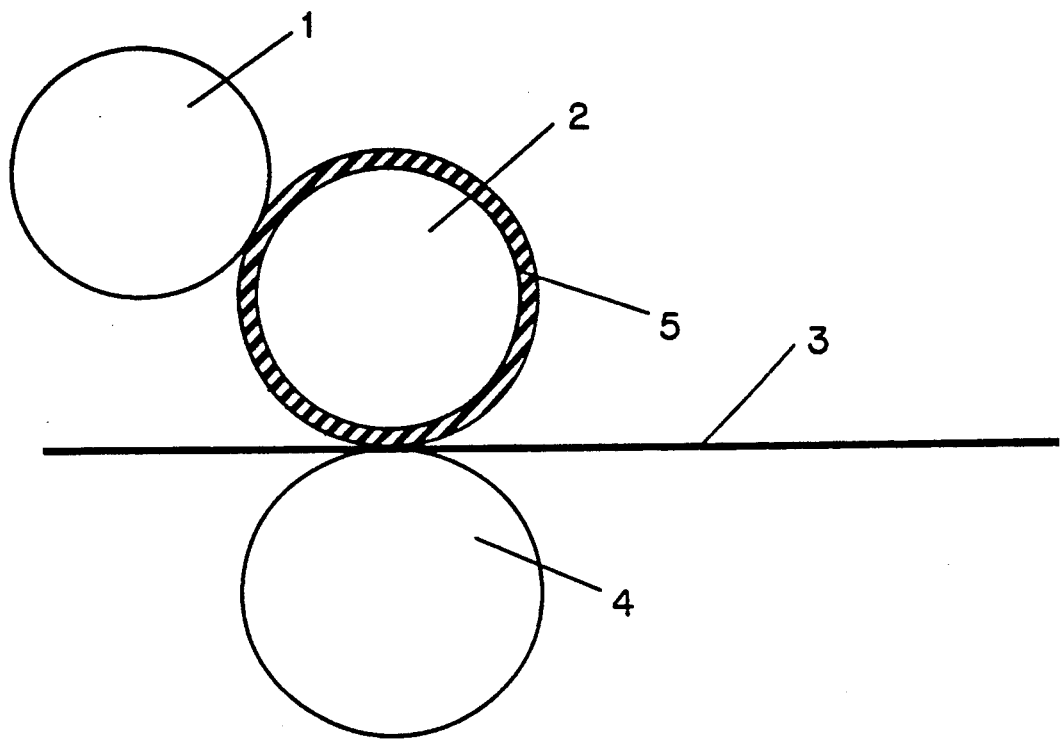
FIG. 1 is a schematic side view of a conventional printing press.
Figure 2:
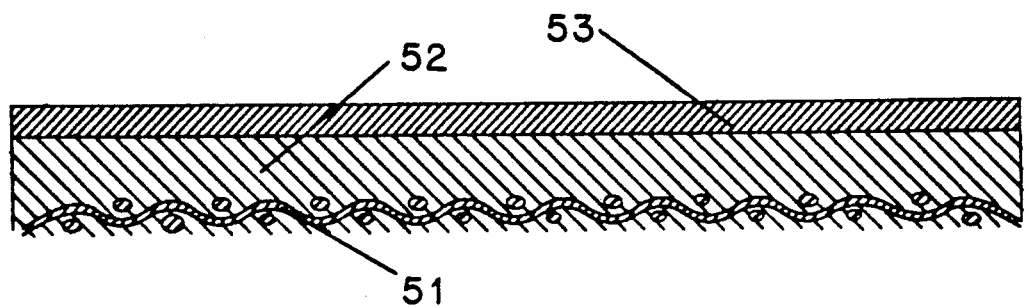
FIG. 2 is an enlarged sectional view which shows by way of example the structure of a printing blanket in accordance with an embodiment of the present invention.

Now, the present invention will be described in detail hereinafter with reference to preferred embodiments and a few examples thereof.

According to the present invention, a surface reforming agent is applied to a surface layer of a printing blanket.

A material containing a perfluoroalkyl group is preferably employable for the surface reforming agent. The material containing a perfluoroalkyl group has significant features that it exhibits a low intensity of critical surface tension and has excellent water repulsibility and oil repulsibility. Another significant feature of this material is such that it is hardly dissolved in a water, an isopropyl alcohol and a petroleum based solvent each of which has been widely used for performing printing operations. Although the surface reforming agent is not inferior in respect of ink receivability and exhibits a low intensity of critical surface tension, it has been found that each printing operation can be performed without any trouble.

It is preferable that the surface reforming agent contains a perfluoroalkyl group having a long chain which assures excellent water repulsibility and oil repulsibility. Particularly, it is preferable that the surface reforming agent contains a perfluoroalkyl group of which carbon number remains within the range of 3 to 12. When the number of carbon is less than 3, there is a possibility that the surface reforming agent fails to exhibit sufficiently high oil repulsibility. On the other hand, even when the number of carbon exceeds 12, there is not recognized a substantial difference in respect of an operational effect compared with the case where the number of carbon remains within the range 3 to 12. A few examples of such a component containing a perfluoroalkyl as mentioned above will be noted below.

$CF_3(CF_2)_6CH_2-$, $CF_3(CF_2)_7SO_2N(CH_2CH_2CH_3)CH_2CH_2-$, $C_8F_{17}CH_2CH_2-$

Any rubber having the aforementioned surface reforming agent added thereto may be employed for the printing blanket of the present invention, provided that it is proven that it can practically be used as a surface layer for the printing blanket. For example, a low-graded nitrile butadiene rubber, an intermediate/high-graded nitrile butadiene rubber or the like can advantageously be employed for the printing blanket of the present invention. However, in view of the fact that surface reformation to be accomplished based on the present invention is intended to reform the printing blanket which has poor ink transferability and paper releasability, it is preferable to employ an intermediate/high-graded nitrile butadiene rubber for the printing blanket of the present invention. In other words, according to the present invention, the printing blanket can be reformed to a printing blanket having excellent properties in respect of oil resistibility, ink receivability, ink transferability and paper releasability by employing an intermediate/high-graded nitrile butadiene rubber which has excellent oil resistibility but is inferior in respect of ink transferability and paper releasability.

According to the present invention, a critical surface tension appearing on the surface of the surface layer of the printing blanket remains within the range of 10 to 16 dyn/cm, as mentioned above. When it is less than 10 dyn/cm, there may arise a malfunction that the ink receivability is deteriorated. On the contrary, when it exceeds 16 dyn/cm, there may arise another malfunction that an effect of surface reformation fails to be exhibited, causing problems associated with the ink transferability and the paper releasability to appear.

To easily accomplish surface reformation by coating or spraying, the surface reforming agent is dissolved in a solvent so that it can be applied to the surface of the surface layer in the form of a solution.

With respect to the solvent to be used for diluting the surface reforming agent, it is preferable to employ a solvent of the type which readily penetrates into the surface layer of the printing blanket. Since the solvent serves to make it easy for the surface reforming agent to penetrate into a rubber constituting the surface layer of the printing blanket, basically, any solvent may be employed for the printing blanket of the present invention, provided that it is proven that it is compatible to the surface reforming agent and readily penetrates into the surface layer of the printing blanket. One or more materials selected from a group consisting of, e.g., toluene, ethyl acetate, methyl isobutyl keton, methyl ethyl keton and others can be employed as a solvent employable for the surface reforming agent.

It is preferable that a quantity of addition of the solvent to the surface reforming agent remains within the range of 0.1 to 50% by weight. When it is less than 0.1% by weight, there is a possibility that a critical surface tension appearing on the surface layer of the printing blanket hardly remains within the range of 10 to 16 dyn/cm, resulting in the operational effect obtainable from the surface reformation being reduced. On the contrary, when it exceeds 50% by weight, there is a possibility that a coating operation is performed with fluctuation from position to position.

As is apparent from the above description, in a case where the surface reforming agent is applied to the surface layer of the printing blanket by coating or spraying, it is preferable that in addition to the aforementioned perfluoroalkyl group, the surface reforming agent contains a group in the form of a functional group which has affinity to the rubber constituting the surface layer of the printing blanket so as to prevent the surface reforming agent from being released from the surface of the surface layer. One or more materials selected from a group consisting of, e.g., an alkyl group, an urethane and others can be noted as an example of the functional group as mentioned above.

Although it is preferably acceptable that the surface reforming agent is applied to the surface layer of the printing blanket in the above-described manner, it may fixedly be secured to the surface layer by allowing it to react on the rubber constituting the surface layer so as to prevent it being released from the surface layer of the printing blanket.

In this case, a compound containing a perfluoroalkyl as mentioned above contains a functional group having chemical reactivity. The functional group having chemical reactivity serves to fixedly secure the foregoing compound to the surface of the surface layer by reaction of the functional group on the surface layer of the printing blanket. One or more materials selected from a group consisting of, e.g., a vinyl group, an acrylic group, a methacrylic group and others each having unsaturable connectedness can be noted as an example of the aforementioned functional group. Particularly, it is preferable that the surface reforming agent is a compound containing a perfluoroalkyl group in the form of acrylic ester or methacrylic ester represented by the following formula in which $R_1$ designates a hydrogen or a methyl group.

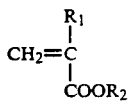

In a case where the foregoing compound exhibits remarkably high viscosity, the aforementioned solvent can advantageously be employed as a solvent for the purpose of dilution, and a quantity of addition of the surface reforming agent can be determined in the same manner as mentioned above.

The foregoing compound is fixedly secured to the surface of the surface layer such that a critical surface tension appearing thereon remains within the range of 10 to 16 dyn/cm.

After the compound containing a perfluoroalkyl is applied to the surface layer by coating, vaporizing or spraying, the functional group is caused to react on the surface layer of the printing blanket. It is desirable that reaction is accomplished by utilizing a thermal energy derived from heating. To this end, the printing blanket is placed in a heating chamber in which the compound reacts on the surface layer of the printing blanket with a thermal energy ranging from 10 to 50 kcal/m$^2$ consumed during the aforementioned reaction.

Some compound exhibits remarkably poor reactivity depending on the structure of a part of the compound containing a perfluoroalkyl. In this case, it is recommendable that a photochemical reaction staring agent is added to the compound by an adequate quantity, and thereafter, ultraviolet rays are irradiated to the same. One or both of two compounds represented by the following two formulas can be noted as an example of the photochemical reaction starting agent.

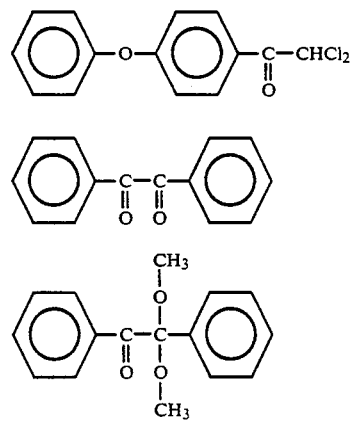

It s recommendable that a quantity of addition of the photochemical reaction starting agent relative to the aforementioned compound containing a perfluoroalkyl group is determined within the range of 0.1 to 10% by weight. When it is less than 0.1% by weight, there is a possibility that photochemical reaction fails to be started no matte how ultraviolet rays are irradiated to the compound. On the contrary, when it exceeds 10% by weight, there arises a danger such as an explosion or the like during the photochemical reacting operation.

It is recommendable that a wavelength of ultraviolet rays to be irradiated to the compound remains within the range of 250 to 350 nm, and irradiation of the ultraviolet rays is accomplished preferably with a quantity of thermal energy ranging from 100 to 500 mJ/cm$^2$ consumed during the photochemical reacting operation. When a quantity of thermal energy derived from the irradiation of the ultraviolet rays is less than 100 mJ/cm$^2$, there is a possibility that the functional group fails to sufficiently react on the compound. On the contrary, when it exceeds 500 mJ/cm$^2$, there is a possibility that the surface layer of the printing blanket is deteriorated, causing crack or the like to occur across the surface layer of the printing blanket.

In addition, according to the present invention, the surface of the surface layer can be reformed by adding the surface reforming agent to the surface layer of the printing blanket. In this case, the paper releasability and the ink transferability can be improved while the surface reforming agent added to and mixed with the surface layer is dispersively distributed on the surface of the surface layer. Since the surface reforming agent is distributed in the surface layer of the printing blanket, an advantageous effect of the present invention is that the printing blanket can practically be used for an elongated period of time.

It is recommendable that a quantity of addition of the surface reforming agent is determined preferably within the range of 0.05 to 10.0% by weight. When it is less than 0.05% by weight, the critical surface tension appearing on the surface layer of the printing blanket hardly remains within the range of 10 to 16 dyn/cm, resulting in an effect of surface reformation being reduced undesirably. On the contrary, when it exceeds 10.0% by weight, there is not recognized a substantial reference in respect of an operational effect compared with the case where it remains within the range of 0.05 to 10.0% by weight.

In this case, it is preferable that a surface reforming agent containing a functional group having affinity to the surface layer is employed for the purpose of surface reformation. In other words, a surface reforming agent having one or more functional groups selected from a group consisting of, e.g., an alkyl group, an urethane group and others is preferably employed for the same purpose as mentioned above.

When the surface layer having the aforementioned surface reforming agent added thereto is to be prepared, an unvulcanized rubber is placed on a fabric having a compressible layer adequately formed thereon to build a laminated structure.

A surface reforming agent of the aforementioned type is added to the unvulcanized rubber. A method of adding the surface reforming agent does not form any part of the present invention. For this reason, the surface reforming agent may be added to a rubber based solution as it is, and then mixed therewith. Alternatively, the surface reforming agent is diluted in a solvent, and the diluted surface reforming agent is then added to and mixed with a rubber based solution.

The unvulcanized rubber compound prepared in the above-described manner is applied to the surface layer of the printing blanket preferably at a rate ranging from 500 to 650 g/m², and thereafter, the coated layer on the surface layer is vulcanized to form a required surface layer preferably employable for the printing blanket.

The surface reforming agent is coagulatively collected in the region in the vicinity of the surface of the surface layer. As a result, the surface of the surface layer is effectively reformed during the step of vulcanization for manufacturing a printing blanket in accordance with the present invention.

EXAMPLE 1

After a compressible layer was placed over a base fabric, it was coated with a paste-shaped unvulcanized nitrile butadiene rubber having the following composition at a rate of 650 g/m² and the coated layer was then vulcanized to form a surface rubber layer.

| COMPOSITION | |
|---|---|
| intermediate/high-graded nitrile butadiene rubber | 100 |
| stearic acid | 1 |
| zinc white | 5 |

-continued

| COMPOSITION | |
|---|---|
| filler | 30 |
| sulphur | 2 |
| vulcanization promoting agent | 3 |
| total | 141 (parts by weight) |

On the other hand, a compound for reforming the surface of a printing blanket was prepared by adding to toluene of 10 parts by weight a surface reforming agent (MCF-312 produced by Dainippon Ink & Chemicals, Inc.) of one part by weight. A perfluoroalkyl group of of the foregoing surface reforming agent was $C_8F_{17}$ which contained an alkyl group serving as an affinitive functional group.

The surface layer of the printing blanket exhibited a critical surface tension of 30 dyn/cm. Subsequently, the surface layer of the printing blanket was uniformly wiped by using the aforementioned surface modifier. It was found from the results derived from measurements conducted after completion of the wiping operation that the critical surface tension was reduced to 12 dyn/cm.

A sheet-feed printing press fabricated by Mitsubishi Heavy Industries, Ltd. was employed as a printing press having the printing blanket of the present invention used therefor, and printing operations were performed with coated papers at a rate of 90 sheets/min while using an ink available for a conventional rotary printing press.

Dot reproducibility was measured with respect to the printing blanket of the present invention manufactured in the above-described manner.

In practice, measurement of the net point reproducibility was achieved by measuring a density of the color on each printed coated paper with the aid of a desitometer. A reflection type desitometer was employed for the foregoing desitometer.

Table 1 shows results in a case where the surface layer of the printing blanket was wiped with the surface modifier in accordance to the present invention (Example 1) and results in a case where no wiping operation was performed (Comparative Example 1).

TABLE 1

| net point area | 20% | 40% | 60% | 80% | 100% |
|---|---|---|---|---|---|
| Example 1 | | | | | |
| concentration | 0.17 | 0.36 | 0.67 | 0.98 | 1.55 |
| area | 32 | 57 | 80 | 92 | 100 |
| Comparative Example 1 | | | | | |
| concentration | 0.20 | 0.42 | 0.72 | 1.06 | 1.49 |
| area | 37 | 63 | 83 | 94 | 100 |

As is apparent from Table 1, it was found from the results derived from printing operations each performed with a same quantity of the ink on form roller using the printing blanket of the present invention that the ink was satisfactorily transferred onto each printing medium with a reduced dot gain and the printing blanket of the present invention exhibited a good surface having excellent releasability.

EXAMPLE 2

After a compressible layer was placed over a base fabric, it was coated with a paste-shaped unvulcanized nitrile butadiene rubber having the following composition at a rate of 650 g/m², and thereafter, the coated layer was vulcanized to form a surface rubber layer.

| COMPOSITION | |
| --- | --- |
| intermediate/high-graded nitrile butadiene rubber | 100 |
| stearic acid | 1 |
| zinc while | 5 |
| filler | 30 |
| sulphur | 2 |
| vulcanization promoting agent | 3 |
| surface reforming agent (MCF-312 produced by Dainippon Ink & Chemicals, Ltd. | 3 |
| total | 144 (parts by weight) |

On the other hand, a compound for reforming the surface of a printing blanket was prepared by adding to toluene of 10 parts by weight the foregoing surface reforming agent of one part by weight. A perfluoroalkyl group of the surface reforming agent was $C_8F_{17}$ which contained an affinitive functional group.

The printing blanket exhibited a critical surface tension of 30 dyn/cm. Subsequently, a surface of the printing blanket was uniformly wiped by using the aforementioned surface reforming agent. It was found from the results derived from measurements conducted after completion of the wiping operation that the critical surface tension was reduced to 12 dyn/cm.

A sheet-feed printing press fabricated by Mitsubishi Heavy Industries, Ltd. was employed as a printing press having the printing blanket of the present invention used therefor, and printing operations were performed with coated papers at a rate of 90 sheets/min while using an ink available for a conventional rotary printing press.

Dot reproducibility was measured with respect to the printing blanket of the present invention manufactured in the above-described manner.

In practice, measurement of the dot reproducibility was achieved by measuring a density of the color on each printed art paper with the aid of the desitometer.

For the purpose of comparison, a conventional printing blanket having a surface layer laminated thereon while containing no surface modifier was manufactured based on the same composition as that in the preceding example exclusive of the surface modifier. Similar tests to those as mentioned above were conducted.

The results derived from the tests are as shown in Table 2.

TABLE 2

| net point area | 20% | 40% | 60% | 80% | 100% |
| --- | --- | --- | --- | --- | --- |
| Example 2 | | | | | |
| concentration | 0.17 | 0.36 | 0.67 | 0.98 | 1.55 |
| area | 32 | 57 | 80 | 92 | 100 |
| Comparative Example 2 | | | | | |
| concentration | 0.20 | 0.42 | 0.72 | 1.06 | 1.49 |
| area | 37 | 63 | 83 | 94 | 100 |

As is apparent from Table 2, it was found from the results derived from printing operations each performed with a same quantity of the ink on form roller using the printing blanket of the present invention that the ink was satisfactorily transferred onto each printing medium with a reduced dot gain, and the printing blanket of the present invention exhibited a good surface having excellent releasability.

EXAMPLE 3

After a compressible layer was placed over a base fabric, it was coated with a paste-shaped unvulcanized nitrile butadiene rubber having the following composition at a rate of 650 g/m², and thereafter, the coated layer was vulcanized to form a surface rubber layer.

| COMPOSITION | |
| --- | --- |
| intermediate/high-graded nitrile butadiene rubber | 100 |
| stearic acid | 1 |
| zinc white | 5 |
| filler | 30 |
| sulphur | 2 |
| vulcanization accelerator | 3 |
| total | 141 (parts by weight) |

On the other hand, a compound containing a perfluoroalkyl group represented by the following formula was coated on the surface layer of the printing blanket by actuating a metallic roll.

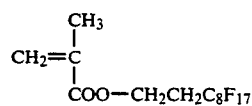

Then, the coated printing blanket was brought into a hot air type chamber immediately after completion of the coating operation so that it was heated and cured in the chamber. A quantity of thermal energy consumed during the heating/curing operation in the hot chamber amounted to 30 kcal/m². It should be noted that prior to the aforementioned processing operations, the surface layer of the printing blanket exhibited a critical surface tension of 35 mN/m.

It was found from the results derived from measurements conducted with respect to the surface layer on the printing blanket of the present invention that a critical surface tension appearing on the surface layer of the printing blanket amounted to 13 mN/m.

A sheet-feed printing press fabricated by Mitsubishi Heavy Industries, Ltd. was employed as a printing press having the printing blanket of the present invention used therefor, and an printing operations were performed with coated papers at a rate of 90 sheets/min while using an ink available for a conventional rotary printing press.

Dot reproducibility was measured with respect to the printing blanket of the present invention manufactured in the above-described manner.

In practice, measurement of the dot reproducibility was achieved by measuring a density of the color on each printed art paper with the aid of the concentration meter. A reflection type desinometer was employed for the foregoing desinometer.

Table 3 shows results in a case where dot reproducibility was measured with respect to the surface layer of the printing blanket (Example 3) and results in a case where the dot reproducibility was measured with respect to the surface layer of the printing blanket molded only of an intermediate/high-graded nitrile butadiene rubber (Comparative Example 3).

Table 3

| net point area | 20% | 40% | 60% | 80% | 100% |
| --- | --- | --- | --- | --- | --- |
| Example 3 | | | | | |
| concentration | 0.17 | 0.36 | 0.67 | 0.98 | 1.55 |
| area | 32 | 57 | 80 | 92 | 100 |
| Comparative Example 3 | | | | | |
| concentration | 0.20 | 0.42 | 0.72 | 1.06 | 1.49 |
| area | 37 | 63 | 83 | 94 | 100 |

As is apparent from Table 3, it was found from the results derived from printing operations each performed with a same quantity of the ink on form roller using the printing blanket of the present invention that the ink was satisfactorily transferred onto each printing medium with a reduced dot gain, and the printing blanket of the present invention exhibited a good surface having excellent releasability.

As described above, the present invention has provided a printing blanket having excellent properties in respect of oil resistibility, ink transferability and paper releasability without any deterioration of ink receivability. In addition, the present invention has provided a method of manufacturing a printing blanket of the foregoing type at a reduced cost.

An advantageous effect of the present invention is that there does not arise a malfunction that the remaining material/image remaining on the preceding printing plate after completion of the preceding printing operation is transferred onto a printing medium such as a paper or the like during a next printing operation, since penetration of the surface modifier into the surface layer of the printing blanket and subsequent stay of the same therein reliably prevents coloring grains in the printing ink from invading further inward of the surface layer of the printing blanket.

Another advantageous effect of the present invention is that there does not appears during a multi-color printing operation a so-called reverse trapping phenomenon, i.e., a phenomenon that when a next color is printed on a paper, the remaining material/image remaining on the preceding printing plate after completion of the preceding printing operation is reversely transferred onto the surface of a printing blanket during a next printing operation, resulting in a quality of printing operation being degraded due to contamination with the ink used during the preceding printing operation.

While the present invention has been described above with respect to preferred embodiments and a few examples, it should of course be understood that the present invention should not be limited only to these embodiments but various changes or modifications may be made without departure from the scope of the present invention as defined by the appended claims.

What is claimed is:

1. A printing blanket including a surface layer on a base fabric with a compressible layer placed on said base fabric, wherein a surface modifier containing a perfluoroalkyl group and a functional group having affinity for a rubber constituting said surface layer is applied to said surface layer while exhibiting affinity to the surface of said surface layer such that a critical surface tension ranging from 10 to 16 dyn/cm appears on the surface of said surface layer.

2. The printing blanket as claimed in claim 1, wherein said surface layer is molded of a compound based on a nitrile butadiene rubber.

3. The printing blanket as claimed in claim 1 or claim 2, wherein said surface modifier contains a perfluoroalkyl group of which carbon number remains within the range of 3 to 12.

4. The printing blanket as claimed in claim 3, wherein a part of said perfluoroalkyl group comprises $CF_3(CF_2)_6CH_2-$, $CF_3(CF_2)_7SO_2N(CH_2CH_2CH_3)CH_2CH_2-$ or $C_8F_{17}CH_2CH_2-$.

5. The printing blanket as claimed in claim 1, wherein said functional group is an alkyl group.

6. A printing blanket including a surface layer on a base fabric with a compressible layer placed on said base fabric, wherein a surface modifier containing a perfluoroalkyl group and a functional group chemically bondable to a rubber constituting said surface layer is added to said surface layer by allowing said functional group to react on the surface of said surface layer in such a manner that a critical surface tension ranging from 10 to 16 dyn/cm appears on the surface of said surface layer.

7. The printing blanket as claimed in claim 6, wherein said surface layer is molded of a nitrile butadiene rubber based compound.

8. The printing blanket as claimed in claim 6 or claim 7, wherein said surface modifier contains a perfluoroalkyl group of which carbon number is within the range of 3 to 12.

9. The printing blanket as claimed in claim 8, wherein a part of said perfluoroalkyl group comprises $CF_3(CF_2)_6CH_2-$, $CF_3(CF_2)_7SO_2N(CH_2CH_2CH_3)CH_2CH_2-$, $C_8F_{17}CH_2CH_2-$.

10. The printing blanket as claimed in claim 6, wherein said functional group contains unsaturated bond.

11. The printing blanket as claimed in any one of claims 6, 7, 8, 9 and 10, wherein said surface modifier comprises a compound represented by the following general formula in which $R_1$ designates a part containing a hydrogen or a methyl group and $R_2$ designates a part containing a perfluoroalkyl group:

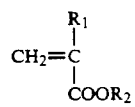

12. A printing blanket including a surface layer on a base fabric with a compressible layer placed on said base fabric, wherein a surface modifier containing a perfluoroalkyl group and a functional group having an affinity for a rubber constituting said surface layer is mixed into said surface layer in such a manner that a critical surface tension ranging from 10 to 16 dym/cm appears on the surface of said surface layer.

13. The printing blanket as claimed in claim 12, wherein said surface layer is molded of a nitrile butadiene rubber bases compound.

14. The printing blanket as claimed in claim 12 or 13, wherein said surface modifier contains a perfluoroalkyl group of which carbon number is within the range of 3 to 12.

15. The printing blanket as claimed in claim 14, wherein a part of said perfluoroalkyl group comprises $CF_3(CF_2)_6CH_2-$, $CF_3(CF_2)_7SO_2N(CH_2CH_2CH_3)CH_2CH_2-$,
$C_8F_{17}CH_2CH_2-$.

16. The printing blanket as claimed in any one of claim 12 to claim 15, wherein an amount of addition of said surface modifier to said surface layer is within the range of 0.05 to 10.0% by weigh.

17. The printing blanket as claimed in claim 12, wherein said functional group comprises an alkyl group.

18. A method of manufacturing a printing blanket, wherein a compressible layer is placed on a base fabric, a surface layer is additionally placed on said compressible layer, and thereafter, a surface modifier containing a perfluoroalkyl group and a functional group having affinity for a rubber constituting said surface layer is added to said surface layer, by applying to said surface layer a solution of said surface modifier in a solvent which is capable of penetrating said surface layer while being compatible therewith to effect the obtainment of a critical surface tension ranging from 10 to 16 dyn/cm appears on the surface of said surface layer.

19. The method as claimed in claim 18, wherein said surface layer is molded of a nitrile butadiene rubber based compound.

20. The method as claimed in claim 18 or 19, wherein said surface modifier contains a perfluoroalkyl group of which carbon number is within the range of 3 to 12.

21. The method as claimed in claim 20, wherein a part of said perfluoroalkyl group comprises $CF_3(CF_2)_6CH_2-$, $CF_3(CF_2)_7SO_2N(CH_2CH_2CH_3)CH_2CH_2-$, $C_8F_{17}CH_2CH_2-$.

22. The method as claimed in claim 18 to 21, wherein said solvent comprises one or more kinds of solvents selected from a group consisting of toluene, ethyl acetate, methyl isobutyl and methyl ethyl.

23. The method as claimed in any one of claim 18 to 21, wherein said surface modifier is added to said solvent by a quantity ranging from 0.1 to 50% by weight.

24. The method as claimed in any one of claim 18 to 23, wherein said functional group comprises an alkyl group.

25. A method of manufacturing a printing blanket, wherein a compressible layer is placed on a base fabric, a surface layer is additionally placed on said compressible layer, and thereafter, a surface modifier containing a perfluoroalkyl group and a functional group chemically bondable to a rubber constituting said surface layer is added to said surface layer by applying a solvent solution of said surface modifier to said surface layer and allowing said surface modifier to react with said surface layer to effect the obtainment of a critical surface tension ranging from 10 to 16 dyn/cm appears on the surface of said surface layer.

26. The method as claimed in claim 25, wherein said functional group contains unsaturated bond.

27. The method as claimed in any one of claims 24 to 26, wherein said surface modifier comprises a compound represented by the following general formula in which $R_1$ designates a part containing a hydrogen or a methyl group and $R_2$ designates a part containing a perfluoroalkyl group;

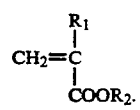

28. The method as claimed in any one of claims 24 to 27, wherein reaction of said functional group on said surface layer is achieved by heating.

29. The method as claimed in claim 28, wherein said reaction is achieved by consuming a thermal energy ranging from 10 to 50 Kcal/m$^2$.

30. The method as claimed in any one of claims 25 to 27, wherein said reaction of said functional group on said surface layer is achieved by adding a photochemical reaction starting agent to said surface layer and irradiating with ultraviolet rays.

31. The method as claimed in claim 30, wherein said photochemical reaction starting agent comprises either one of two compounds represented by the following two formulas:

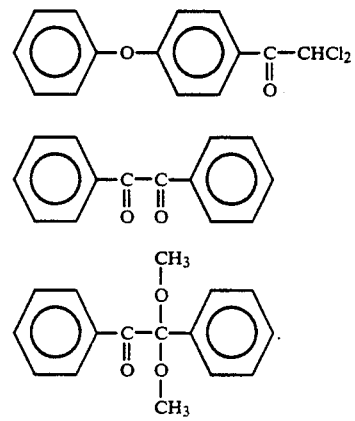

32. The method as claimed in claim 30 and 31, wherein said photochemical reaction staring agent is added to said surface modifier by a quantity ranging from 0.1 to 10% by weight.

33. A method as claimed in claim 30, wherein said ultraviolet rays have a wavelength ranging from 250 to 350 mn, and a quantity of irradiation of said ultraviolet rays is within the range of 100–500 mJ/cm$^2$.

* * * * *